US006069316A

United States Patent [19]

Utke

[11] Patent Number: 6,069,316

[45] Date of Patent: May 30, 2000

[54] WIRE SEALING SYSTEM

[76] Inventor: Gene H. Utke, 9650 SW. Marina Dr., Arcadia, Fla. 34266

[21] Appl. No.: 09/038,029

[22] Filed: Mar. 11, 1998

Related U.S. Application Data

[62] Division of application No. 08/700,091, Aug. 20, 1996, Pat. No. 5,728,987

[60] Provisional application No. 60/002,561, Aug. 21, 1995.

[51] Int. Cl.[7] ........ H02G 3/18

[52] U.S. Cl. ........ 174/65 G; 174/65 SS; 174/152 G; 174/153 G

[58] Field of Search ........ 174/65 G, 65 SS, 174/135, 151, 152 G, 153 G; 248/56; 16/2.1, 2.2

[56] References Cited

U.S. PATENT DOCUMENTS

| | | | |
|---|---|---|---|
| 2,169,967 | 8/1939 | Smith | 174/152 G |
| 2,211,780 | 8/1940 | Jacobs | 174/152 G X |
| 2,359,215 | 9/1944 | Gold | 174/65 SS X |
| 2,631,819 | 3/1953 | Duncan | 248/56 X |
| 2,665,146 | 1/1954 | Berg et al. | 248/56 X |
| 2,717,792 | 9/1955 | Pelley | 174/152 G X |
| 3,056,852 | 10/1962 | Sachs | 174/153 G |
| 3,744,008 | 7/1973 | Castellani | 248/56 X |
| 4,193,604 | 3/1980 | Sarvanne | 174/79 X |
| 4,375,011 | 2/1983 | Grunau | 174/65 SS |
| 4,549,755 | 10/1985 | Kot et al. | 174/65 SS X |
| 5,557,073 | 9/1996 | Truesdale, Jr. et al. | 174/65 SS X |

*Primary Examiner*—Dean A. Reichard
*Attorney, Agent, or Firm*—Frank A. Lukasik

[57] ABSTRACT

The invention is directed to a wire sealing system including a two piece plastic part having a tapered end, and a bushing wrapping an incoming wire and locked within a cover to provide a secure seal for the wire.

2 Claims, 6 Drawing Sheets

WIRE SEALING SYSTEM

This is a Division of Ser. No. 08/700,091, now U.S. Pat. No. 5,728,987, Filed Aug. 20, 1996, Provisional Application Ser. No. 60/002,561, Filed Aug. 21, 1995, and filed originally as Disclosure Document No. 373,331,

BACKGROUND OF THE INVENTION

1. Field of the Invention

The invention relates to float switches and more specifically, the invention relates to float switches which open and close an electrical circuit in response to the repositioning of a sphere within a raceway caused by a change in the attitude of the switch, and a seal/strain relief fastener.

2. Discussion of the Prior Art

Many different types of float switches have been developed for opening and closing an electrical circuit in response to the level of a liquid within a reservoir. Generically, float switches include a floating buoy and a means, responsive to the vertical position of the bouy, for alternately closing an electrical circuit when the float achieves a predetermined maximum height and opening the electrical circuit when the float achieves a predefined minimum height, normally open, or normally closed.

One type of available float switch is known as a sphere-actuated float switch as taught by U.S. Pat. No. 5,142,108 to Johnston et al, which includes a cage defining a longitudinal raceway, a yoke pivotally mounted externally to the stage and having first and second legs which extend into the raceway, an electrical switching means which is electrically open when the yoke is in a first position and electrically closed when the yoke is in a second position, an over-center spring capable of biasing the yoke into the apropriate electrically closed positions once the yoke is urged past a transition point, and a sphere within the raceway for urging the yoke between the electrically open and the electrically closed positions.

Another type of available float switches is known as a mercury-actuated switch. Mercury-actuated float switches provide superior switching performance, however, because of environmental concerns relating to the use of mercury, alternatives to the mercury-actuated switch are being explored.

SUMMARY OF THE INVENTION

The invention is directed to a gravity operated float switch wherein the gravity causes a ball to move down to the switch end of the float. The weight of the ball forces the operating rod to move into a position where the contact arm moves into the operating rod slot. A contact tension spring applies pressure on an upper contact substrate, forcing the upper substrate toward the lower substrate, bringing the contacts together and closing the circuit. The design of the central part of the switch body determines the on and off differential of the switch.

The size of the float is smaller than prior art devices thereby fitting into small pumps. The invention is omnidirectional and not sensitive to rotation. The switch is mechanically activated, thereby free of mercury. Turbulence does not effect its operation. In addition, the switch has a 5 to 120 degree differential using the same mold, a higher differential. The cable is sealed without epoxy thereby making assembly easier and less expensive. The switch body is molded into the float housing thereby using less parts.

There is only one small part required to be high temperature plastic thereby reducing cost. Using only one pair of contacts reduces the cost and reduces the number of problems. Extra large contacts are also available. Standard sized MICRO SWITCHES may be used if desired. Other advantages include, no contact bounce, longer contact life, mechanical wire connections to the contacts, and no troublesome welds. A 100 AMP locked rotor current rating is possible, the highest in the industry.

The switch is operated by rolling ball low friction with guaranteed switch action by weight of the ball, not relying on the speed at which the ball moves. The inertia of the ball stopping does not travel through switch parts, thus no impact breakage. The ball moving away from contacts does not change contact pressure. A snap action switch, with only one spring used, with no loose contacts to jump out of place. The switch is a snap action switch and may be used for pump up or pump down with the same parts. It can be built as a pump switch or control switch with the same mold. The outer case is impact resistant, and the internal parts cannot be broken by impact. Silver Cad contacts are used for longer life. All internal parts are designed to remain in place and will not jar loose. The float housing and switch parts are designed to accept and operate a micro switch for special applications.

DETAILED DESCRIPTION OF THE PREFERRED EMBODIMENTS

Figure 1:
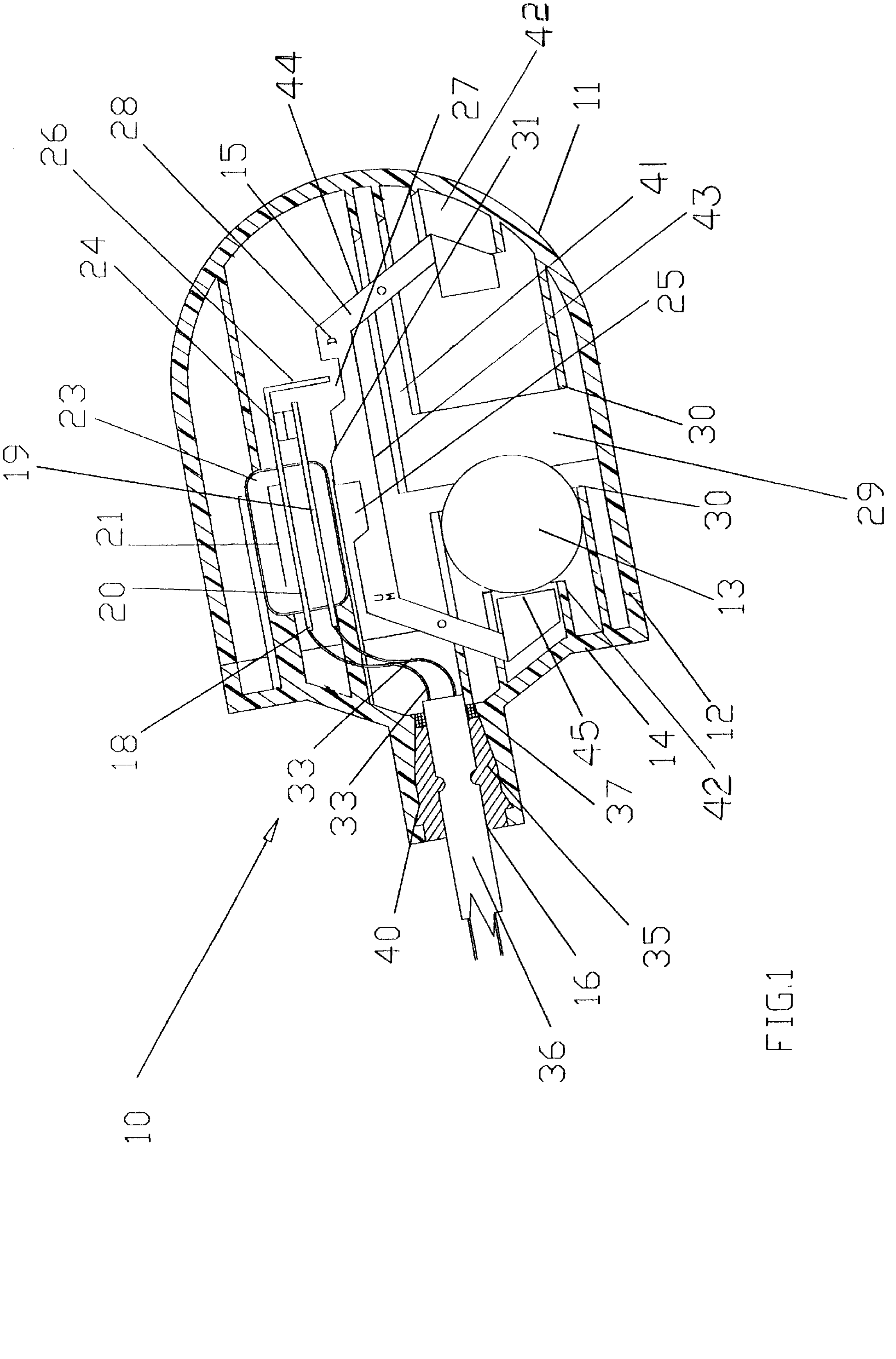
FIG. 1. is an elevational view, partially in section, of one embodiment of the invention in an electrically closed position.

Referring now to FIG. 1, there is shown a gravity operated cam switch referred generally by the numeral 10. FIG. 1 shows the gravity operated cam switch 10 in a raised, or on position. The principle parts of the switch 10 are, the cup 11, cover 14, operating rod 15, ball 13, switch 23, and switch body barrier 30. The cup 11 may be plastic, molded in one piece, either clear or colored. The switch body, contact block 23, is inserted into the float housing cup 11. The float housing cover 14 is generally round shaped similar in shape to the type of float commonly found in most toilet water tanks. The cup 11 and cover 14 are joined and sealed as at weld joint 12 to form a water tight seal for the operating parts of the switch 10.

Switch body barrier 30 (raceway) is molded into the float housing, cup 11. Operating rod 15 guideways 41 are also formed into the float housing, cup 11. The central part 29 of switch 10 is an open space where ball 13 is held in a neutral position as it is being lifted between either of the two positions. Guideways 41 are formed in the mold with switch body barrier 30 and central part 29. Guideway housing 42 forms a protective stop for the ball 13 at the end of its travel in the up or down position.

Operating rod 15 may be formed of plastic or metal in a generally "U"-shape configuration with a longitudinal portion 43 and two angular legs 44. Ball contact points 45 are formed at the end of each of the legs 44. Operating rod 15 contains several operating zones including PUMP UP slot 25, micro switch cam 31, and PUMP DOWN slot 27. Operating rod dowels 17 are fastened to each of the angular legs 44 to guide the operating rod 15 within guideways 41. Letters 28 are molded into or placed on operating rod 15 to denote PUMP UP-"U", or PUMP DOWN-"D" to indicate the reversible nature of operating rod 15.

Contact block 23 holds the operating elements of the switch 10, such as the lower contact substrate 19, upper contact substrate 20 and contact tension spring 21. Wires 33 are fastened to substrates 19 and 20 with two wire crimps 18. Upper contact substrate 20 is extended to a point where it is bent 90° to form contact arm 26. Each of the substrates 19 and 20 have one of a pair of contacts 24 affixed thereto. Contact tension spring 21 is affixed to the contact block 23 and is pressed against upper contact substrate 20 to apply closing pressure on contacts 24.

FIG. 1 shows a pump down float switch 10 in a raised or "ON" position. Gravity has caused the ball 13 to move down to the switch end of the float. The weight of the ball 13 forces the operating rod 15 to move into a position where the contact arm 26 moves into the operating rod slot 27. Contact tension spring 21 applies pressure on upper contact substrate 20, forcing the upper contact substrate 20 toward the lower substrate 19 bringing the contacts 24 together and closing the circuit. As the water level decreases, the float is lowered down to the position shown in FIG. 2. First the ball 13 moves away form the operating rod 15 to the central part of the switch body 29. The operating rod 15 does not move because of the contact arm 26 in the operating slot 27 holds the operating rod 15 from moving. The design of the central part of the switch body 29 determines the "ON" and "OFF" differential of the switch 10. The switch 10 differential has a range of 5 degrees to 120 degrees and still retains a snap action switch. As the angle of the float decreases to the point where the ball 13 moves to the opposite end of the switch 10 body. This causes the operating rod 15 to also travel to the opposite end of the switch 10 body. As the operating rod 15 moves, it causes the contact arm 26 to raise up following the cam in operating rod slot 27. This forces the upper contact substrate 20 to raise and open the contacts 24. As the float angle increases, the ball 13 moves away from the operating rod 15 and back to the central part of the switch body 29. The operating rod 15 does not move because the contact arm 26 holds the operating rod 15 in place with spring tension provided by spring 21. As the angle increases more, the ball 13 jumps the switch body barrier 30 and moves the operating rod 15 to operate the switch 10.

Figure 2:
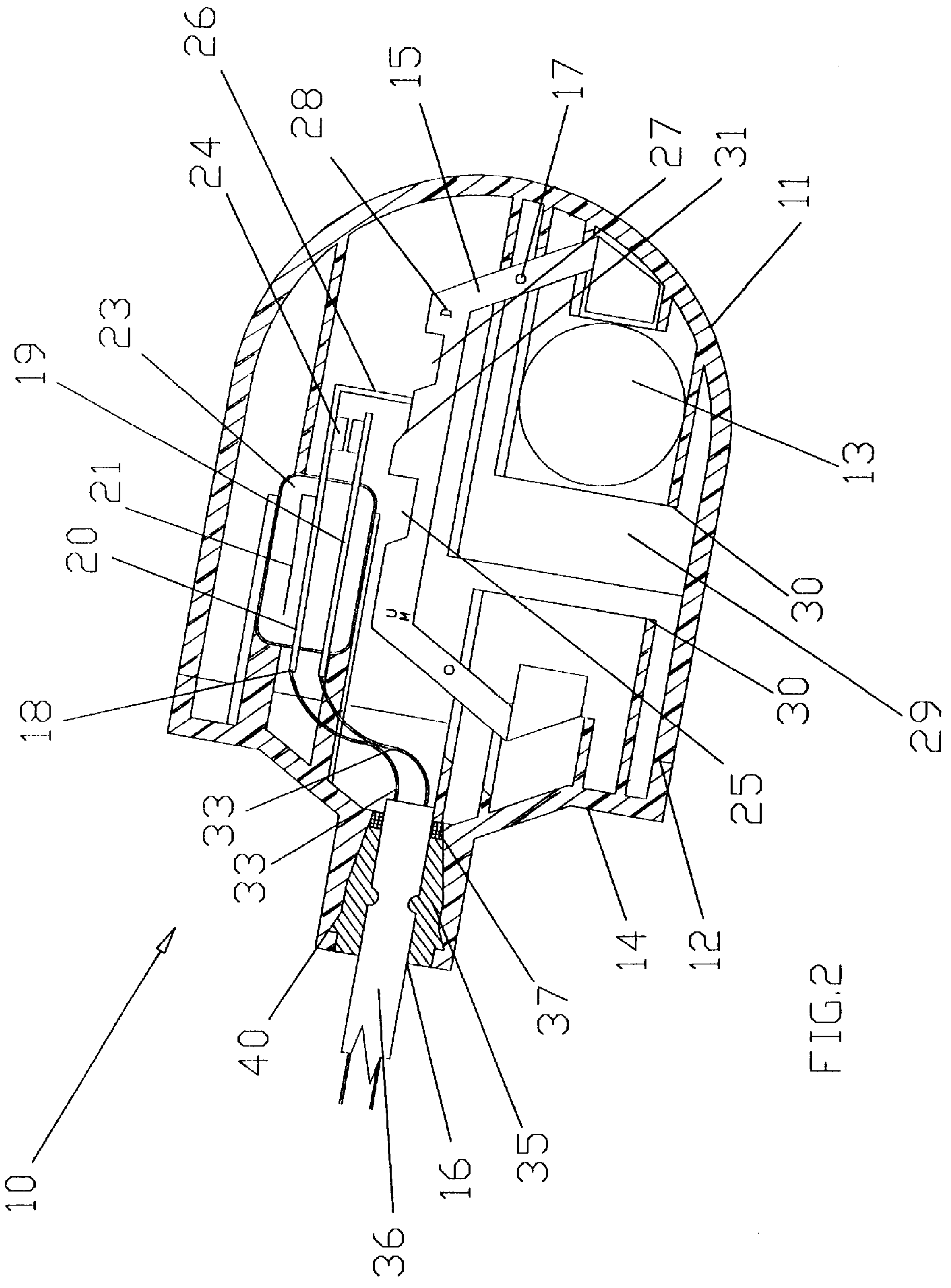
FIG. 2 depicts the invention embodiment shown in an electrically open position.
Figure 3:
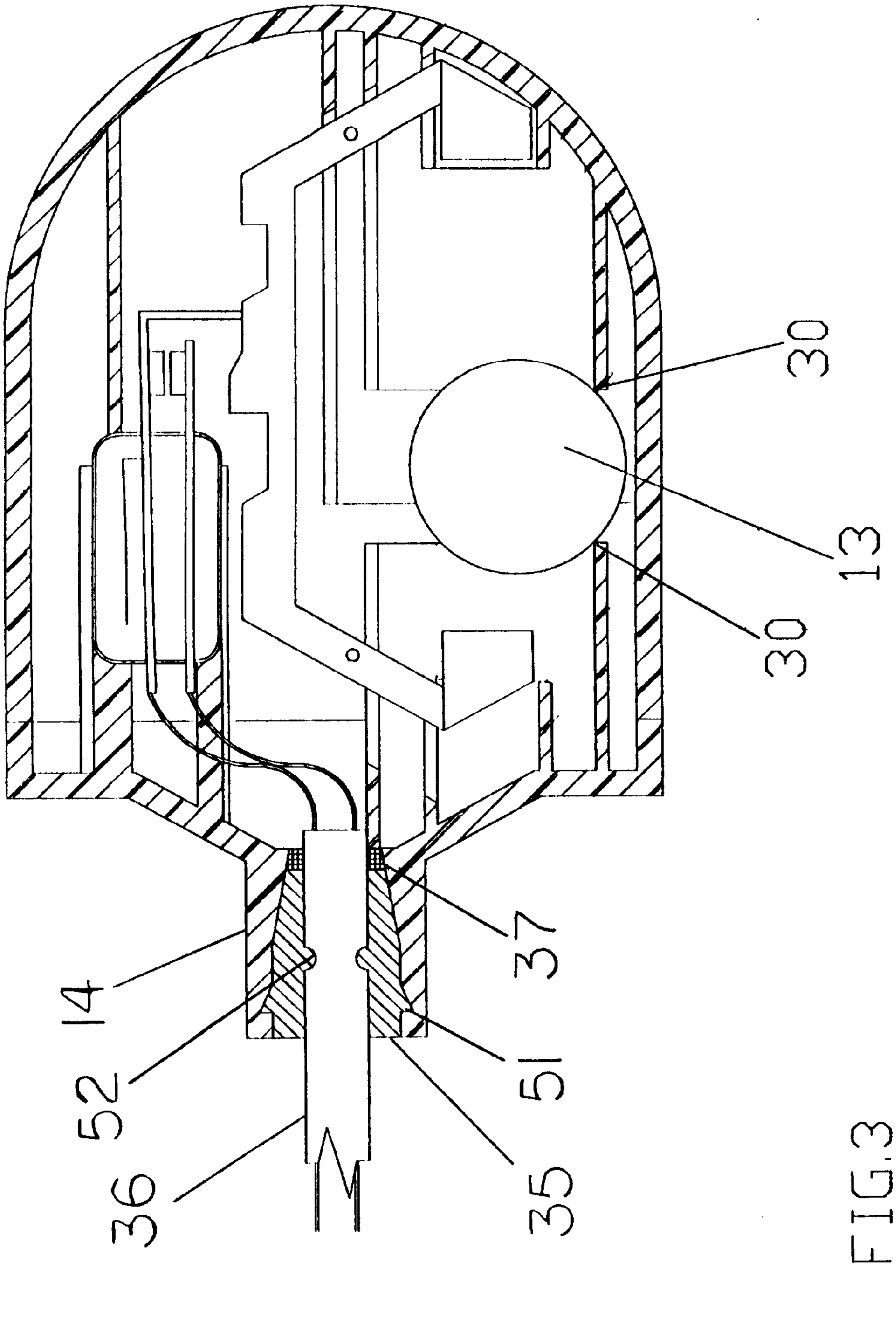
FIG. 3 depicts the invention embodiment in an electrically open position with the ball in a neutral position.
Figure 4:
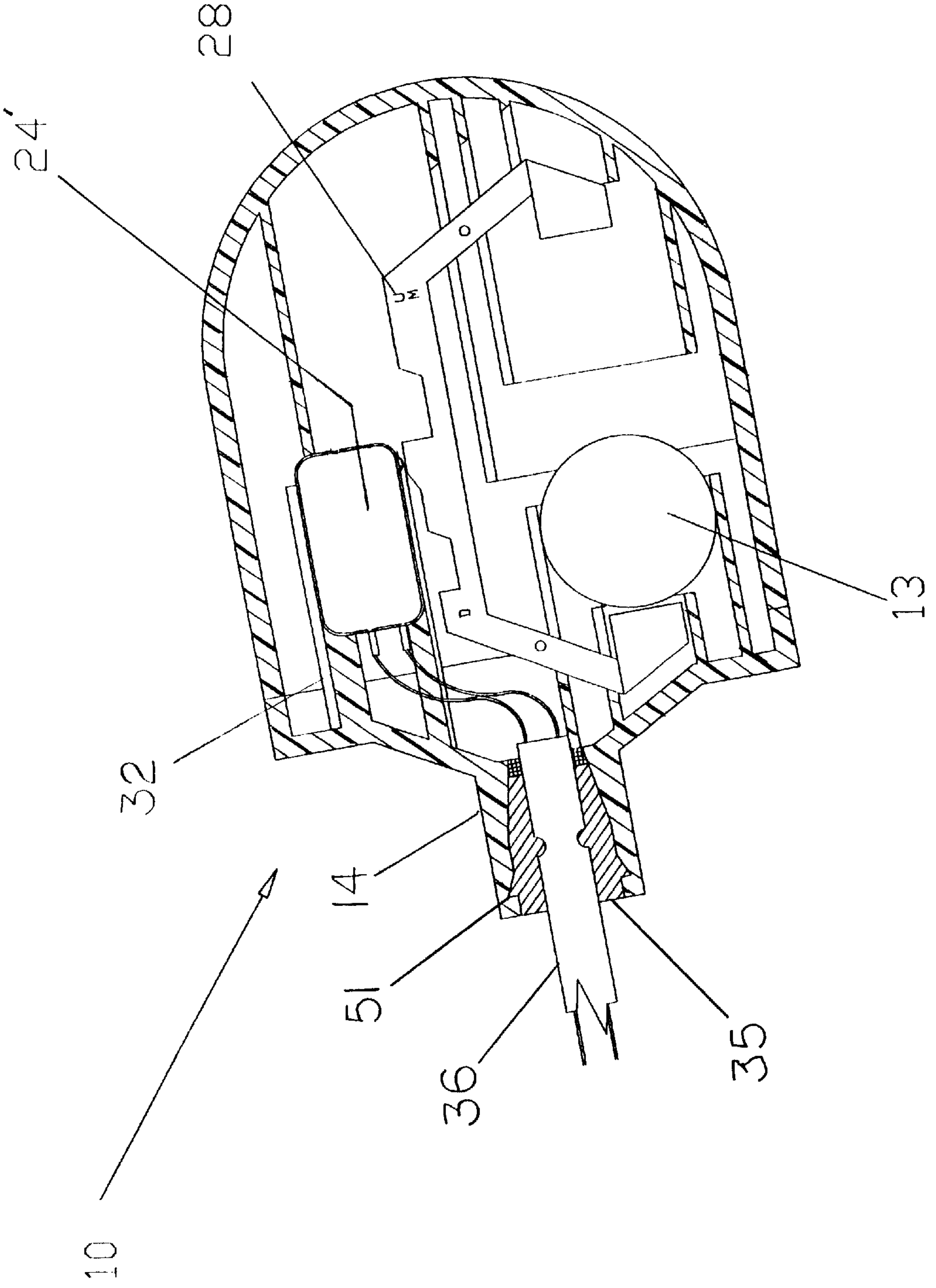
FIG. 4 is an elevational view, partially in section, of a second embodiment of the invention in an electrically closed position.
Figure 5:
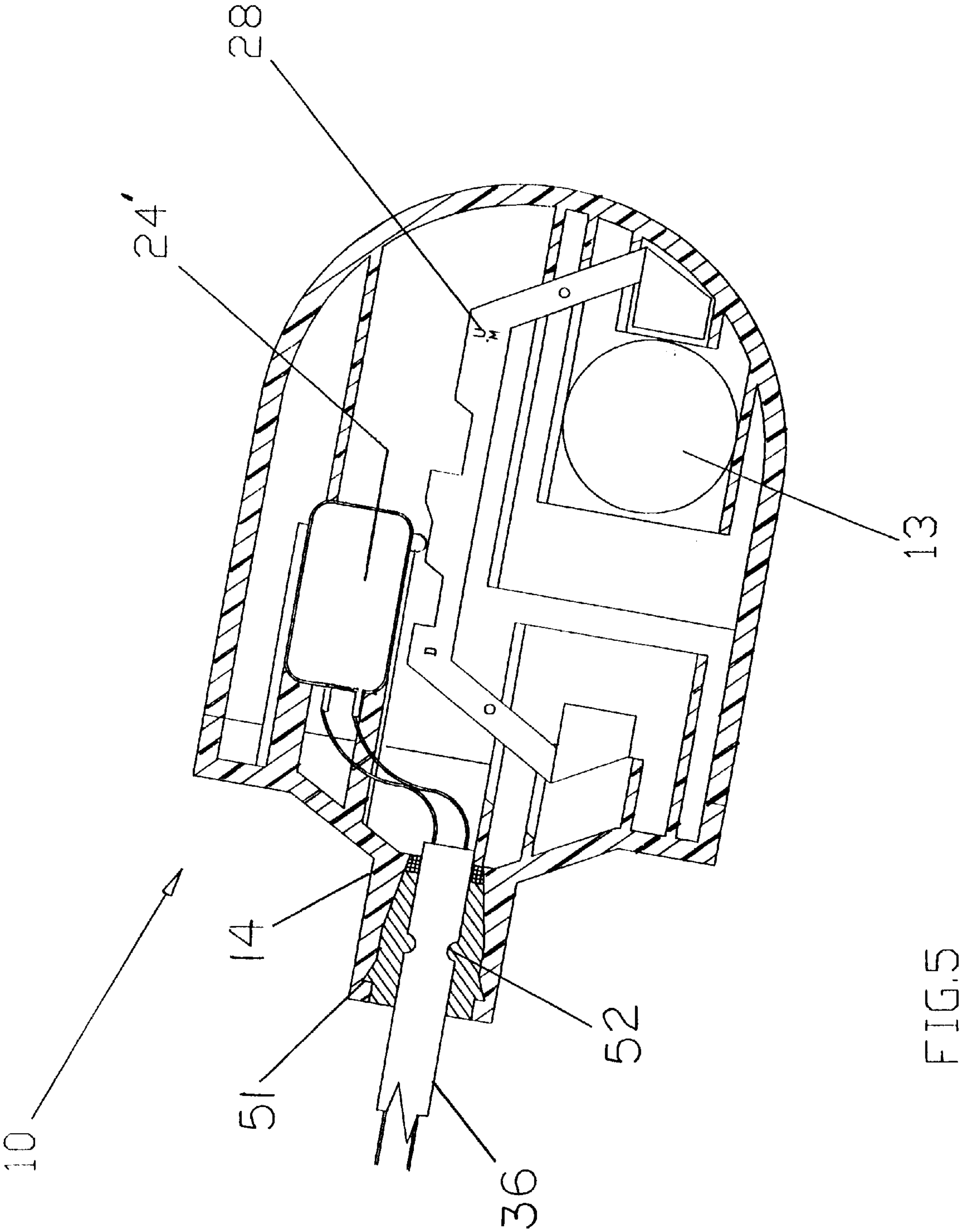
FIG. 5 depicts the second embodiment of the invention in an electrically open position.

FIGS. 1 and 2 show a pump DOWN float switch 10. To build a pump UP switch, shown in FIGS. 4 and 5, reverse the operating rod 15 during manufacture. The letters U or D (28) indicates if it will be a pump UP or a pump DOWN switch.

Wire connections are made to the contact substrates 19 and 20 by a crimp connection 18 which is part of the substrates. All float and switch parts are low temperature PVC except the contact body 23. The contact body 23 locks into the float cover 14 with a snap lock fit. Switch housing, float cover 14 also has four angled fingers 32 that hold a micro switch 24' in position where the heavy duty switch is normally positioned, FIGS. 4 and 5. This micro switch 24' operates with the operating rod 15 in the same way as with the heavy duty switch in relation to the ball 13 but a micro switch cam 31 operates the micro switch 24'. A PUMP UP or PUMP DOWN switch can be selected by connecting the wires to the proper normally open or normally closed contacts.

In the submersible pump and float switch industry there is a need for an inexpensive, but effective means for sealing the cable entry into the product. This means making a water tight seal and also providing a clamping mechanism on the cable, to prevent the cable from being pulled out of the product. This means of providing a strain relief and water tight seal must be small in size, as there is little space in a product such as a float switch to accomplish this. The seal and strain relief should also be inexpensive and be able to be installed with little labor. The seal and strain relief must also be able to accommodate a variable cable size, as the cable has a size tolerance as manufactured. There must also be a means of manufacturing this seal for different cable sizes and still be able to seal the product. Some of the means now used to accomplish this are the use of epoxies and large compression fittings. The epoxy method is time consuming and expensive, as the epoxy takes a long time to set up hard. The external compression system has the possibility of the seal working loose.

Figure 8:
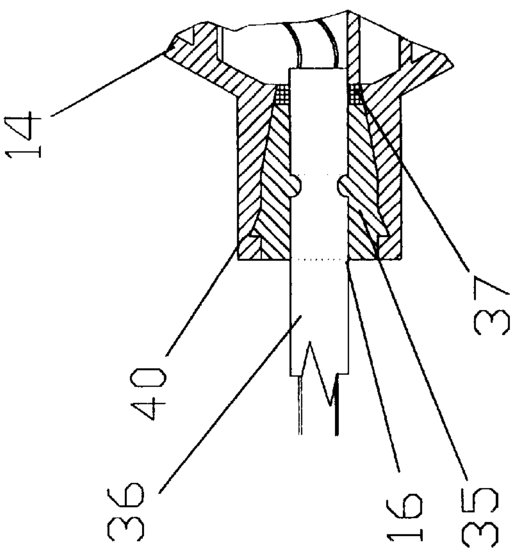
FIG. 8 is a side view, in section, of the sealed float of teh invention.
Figure 7:
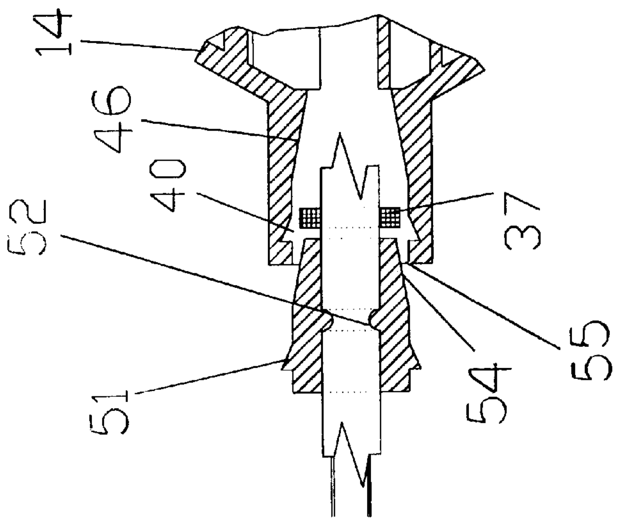
FIG. 7 is an exploded side view, partially in section, of the seal/strain relief fastener being inserted within the float switch of the invention.
Figure 6:
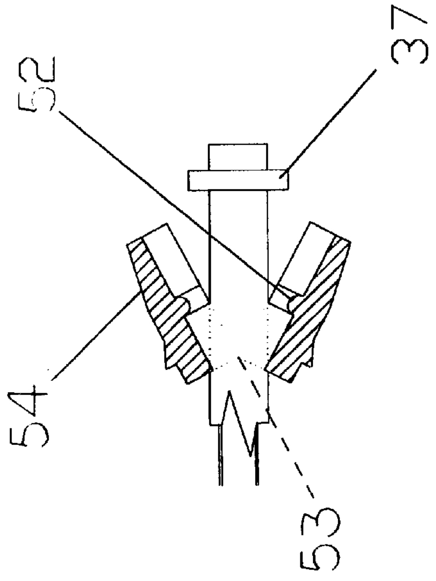
FIG. 6 is an exploded side view, partially in section, of the seal/strain relief fastener of the invention.

The seal/strain relief as shown in FIGS. 6–8 provides the following features: A single molded PVC or polypropolene part provides the stress relief on the cable and provides the mechanical force to comprise a rubber seal onto the cable. This single piece also provides the means to lock itself into position once it is installed.

The strain relief seal 35 is a two piece plastic part, with hinge 53, holding the two part together. The relief seal 35 grips the cable 36 to keep it from being pulled out of the switch 10 and also supplies pressure on a rubber bushing 37 around the cable 36 forcing the bushing 37 into the conical area 46. The raised rib 52 presses into the cable 36 continuously around the cable 36. The locking tabs 51 snap into the locking holes 40 molded into the switch housing, cover 14 to lock it into position. If extreme sealing pressure would be required, extra locking tabs could be added.

In assembling the seal/strain relief, the cable 36 is inserted through the molded plastic seal 35. The seal 35 opens to receive the cable 36 at a living hinge 53. Once on the cable 36, the seal 35 is pressed into a closed position. This allows the raised rib 52 to press into the cable 36 continuously around the cable 36. The bushing 37 is slipped onto the cable 36 and the cable 36 is fed through the cable entry hole 16 in the seal 35. As the seal 35 is pushed into the tapered wall conical area 46, the tapered end 54 of the seal 35 follows the tapered wall conical area 46 of float cover 14 to complete the closing of the seal 35 and forces the strain relief rib 52 into the cable 36. When the seal 35 is fully into the conical area 46, the rubber bushing 37 is forced to change its shape (compressed), to provide a tight seal between the cable 36 and the switch 10.

When the seal 35 is fully seated, the locking tabs 51 snap into the locking holes 40 molded into the switch housing, cover 14 to lock it into position.

In summary, the use of the operating rod cam provides a strong force to overcome the pressure of the extra heavy spring tension holding the contacts closed. Contact pressure with this design is far the greatest of any float switch in the industry. High contact pressure guarantees high current capacity and extra life.

This design, using the least amount of parts with crimp connections provide for easy low tech assembly. Cost is kept to the minimum by few parts, fast assembly, and the use of the least amount of high temperature plastic. The guideway 41 (raceway) that the ball 13 travels through is molded into the cup 11 and the switch housing, cover 14 to reduce the number of parts.

The option of using a micro switch in place of the heavy duty snap switch allows the float switch to fit the small horsepower, budget market. With the heavy duty switch option, the float switch handles the high horsepower pumps with high starting current. The strain relief/seal provides an instant, positive cable seal, low cost, reliable and easily installed.

The design of the central part of the switch provides a switch differential in a fixed range between 5 degrees to 120 degrees to suit different applications. By molding this function into the cup and cover, extra parts are eliminated.

Thus it will be appreciated that the present invention provides a highly improved proximity switch for use particularly with submersible sump and sewage pumps. While alternative embodiments of the invention have been described, it is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. A strain relief seal for gripping and sealing a cable in a switch housing, said seal comprising:

seal installation means having a conical area and locking holes formed in the housing for sealing and gripping the cable, sealing means consisting of a two piece plastic seal, said plastic having a hinge connecting said two pieces at a first end and said seal having a cable entry hole formed therein from said first end to a second end, a tapered end, locking tabs, and an internal raised rib, and a rubber bushing around said cable for sealing said cable, said seal installation means and said sealing means cooperating to compress said rubber bushing, said raised rib, and said cable, thereby sealing said sealing means cable entry hole.

2. A strain relief seal for gripping and sealing a cable in a switch housing, said seal comprising:

a two piece, molded plastic seal having a first end and a second end, said plastic seal having a hinge connecting said first end of said two pieces of said seal, and said seal having a cable entry hole formed therein from said first end to said second end, a tapered end, locking tabs, and an internal raised rib, a rubber bushing mounted on and around the cable for sealing said cable, and a switch housing having a cable entry hole, a conical area formed in said cable entry hole for engaging said plastic seal and compressing said two piece plastic seal and said rubber bushing, and locking holes in said switch housing for gripping said locking tabs.

* * * * *